US009766086B1

United States Patent
Rodoni

(10) Patent No.: US 9,766,086 B1
(45) Date of Patent: Sep. 19, 2017

(54) SYSTEM HAVING AUTOMATED ROUTE DETECTION AND APP INITIATION

(71) Applicant: Rubicon Global Holdings, LLC, Atlanta, GA (US)

(72) Inventor: Philip Rodoni, Decatur, GA (US)

(73) Assignee: Rubicon Global Holdings, LLC, Atlanta, GA (US)

( * ) Notice: Subject to any disclaimer, the term of this patent is extended or adjusted under 35 U.S.C. 154(b) by 0 days.

(21) Appl. No.: 15/294,319

(22) Filed: Oct. 14, 2016

(51) Int. Cl.
*B65F 3/00* (2006.01)
*G01C 21/34* (2006.01)
*G01C 21/36* (2006.01)

(52) U.S. Cl.
CPC .............. *G01C 21/343* (2013.01); *B65F 3/00* (2013.01); *G01C 21/3676* (2013.01); *G01C 21/3697* (2013.01)

(58) Field of Classification Search
CPC .............. G01C 21/343; G01C 21/3676; G01C 21/3697; B65F 3/00; G01S 19/42; G01S 5/0294
See application file for complete search history.

(56) References Cited

U.S. PATENT DOCUMENTS

| | | | | |
|---|---|---|---|---|
| 5,014,206 A | * | 5/1991 | Scribner | G07C 5/008 340/3.31 |
| 5,527,147 A | * | 6/1996 | Hulls | B65F 9/00 100/229 A |
| 6,448,898 B1 | * | 9/2002 | Kasik | B65F 1/14 177/137 |
| 8,185,277 B2 | * | 5/2012 | Flood | B65F 1/1484 701/117 |
| 2009/0240554 A1 | * | 9/2009 | Oswald | G06F 17/30241 705/7.11 |
| 2014/0074815 A1 | * | 3/2014 | Plimton | G06F 17/30572 707/709 |

* cited by examiner

*Primary Examiner* — Richard Camby
(74) *Attorney, Agent, or Firm* — Finnegan, Henderson, Farabow, Garrett & Dunner, LLP

(57) ABSTRACT

A system is disclosed for managing waste services by a service vehicle. The system may have a locating device configured to generate a location signal, a sensor configured to generate a service signal indicative of a waste service being performed, an input device, and a controller in communication with the locating device, the sensor, and the input device. The controller may be configured to make a determination that the service vehicle has made at least one service stop based on the location and service signals, and to make a comparison of characteristics of the at least one service stop with characteristics of at least one service stop of at least one known service route. Based on the comparison, the controller may be further configured to selectively transmit the recorded characteristics offboard the service vehicle.

11 Claims, 4 Drawing Sheets

SYSTEM HAVING AUTOMATED ROUTE DETECTION AND APP INITIATION

TECHNICAL FIELD

The present disclosure relates generally to a system and an app (i.e., a downloadable self-contained software application) for use on a mobile device. More particularly, the present disclosure relates to a system that detects which route a service vehicle is following and automatically calls up a corresponding graphical user interface within a waste management app for use by the vehicle operator during completion of the detected route.

BACKGROUND

Commercial and residential waste service providers typically dispatch service vehicles to customer properties according to a predetermined pickup schedule assigned to each vehicle. The pickup schedule for each service vehicle is often designed to provide waste services (e.g., to empty waste receptacles) within a particular geographical area and at a particular frequency (e.g., once per week). After completion of each waste service (or periodically during completion of the route), the vehicle operator reports the completion to a back office, which updates the operator's pickup schedule and an account record for the customer. Customers that subscribe to these waste services are billed based on the account record. The operator then maneuvers the service vehicle to a next customer location for completion of additional waste services.

In some instances, it may be difficult to manage the pickup schedule for each service vehicle. In particular, the pickup schedule can change frequently and include new customer locations and/or locations having complex service requirements. In these instances, it can be difficult for the vehicle operator to determine which stops to make, the order of the stops, the timing of the stops, etc. It can also be difficult to find the new locations, to determine travel routes to new locations, to manage instructions associated with required services at each location, and to keep track of the completed services.

Waste management apps exist that, when called up by the vehicle operator, can help the operator manage the assigned travel route. For example, the operator may be able to manually choose from a selection displayed via the app which of a plurality of stored routes the operator would like to complete. The operator may then follow instructions from the app during completion of the chosen route, and provide feedback via the app regarding completion of services at stops in the route.

While an improvement over previous methods, it may be difficult in some instances to ensure that the vehicle operator calls up the available app at a beginning of an assigned route, that the operator correctly selects the right route for the given day and/or time of day, and/or that the operator uses the app during completion of the route. In particular, some operators may not be properly trained how to use the app, while other operators may be too occupied with other tasks to focus on use of the app.

The disclosed system and app are directed to overcoming one or more of the problems set forth above and/or other problems of the prior art.

SUMMARY

In one aspect, the present disclosure is directed to a system for managing waste services by a service vehicle. The system may include a locating device configured to generate a location signal indicative of a location of the service vehicle, a sensor configured to generate a service signal indicative of a waste service being performed by the service vehicle, an input device, and a controller in communication with the locating device, the sensor, and the input device. The controller may be configured to make a determination that the service vehicle has made at least one service stop based on the location and service signals, and to make a comparison of characteristics of the at least one service stop with characteristics of at least one service stop of at least one known service route. Based on the comparison, the controller may be further configured to selectively transmit the recorded characteristics offboard the service vehicle.

In another aspect, the present disclosure is directed to a method for managing waste services by a service vehicle. The method may include generating a location signal indicative of a location of the service vehicle, generating a service signal indicative of a waste service being performed by the service vehicle, and making a determination that the service vehicle has made at least one service stop based on the location and service signals. The method may also include making a comparison of characteristics of the at least one service stop with characteristics of at least one service stop of at least one known service route and, based on the comparison, selectively displaying a graphical user interface on an input device inside of the service vehicle, showing information associated with the at least one known service route.

In yet another aspect, the present disclosure is directed to a non-transitory computer readable medium containing computer-executable programming instructions for managing waste services by a service vehicle. The method may include generating a location signal indicative of a location of the service vehicle, generating a service signal indicative of a waste service being performed by the service vehicle, and making a determination that the service vehicle has made at least one service stop based on the location and service signals. The method may also include making a comparison of characteristics of the at least one service stop with characteristics of at least one service stop of at least one known service route and, based on the comparison, selectively displaying a graphical user interface on an input device inside of the service vehicle, showing information associated with the at least one known service route.

DETAILED DESCRIPTION

Figure 1:
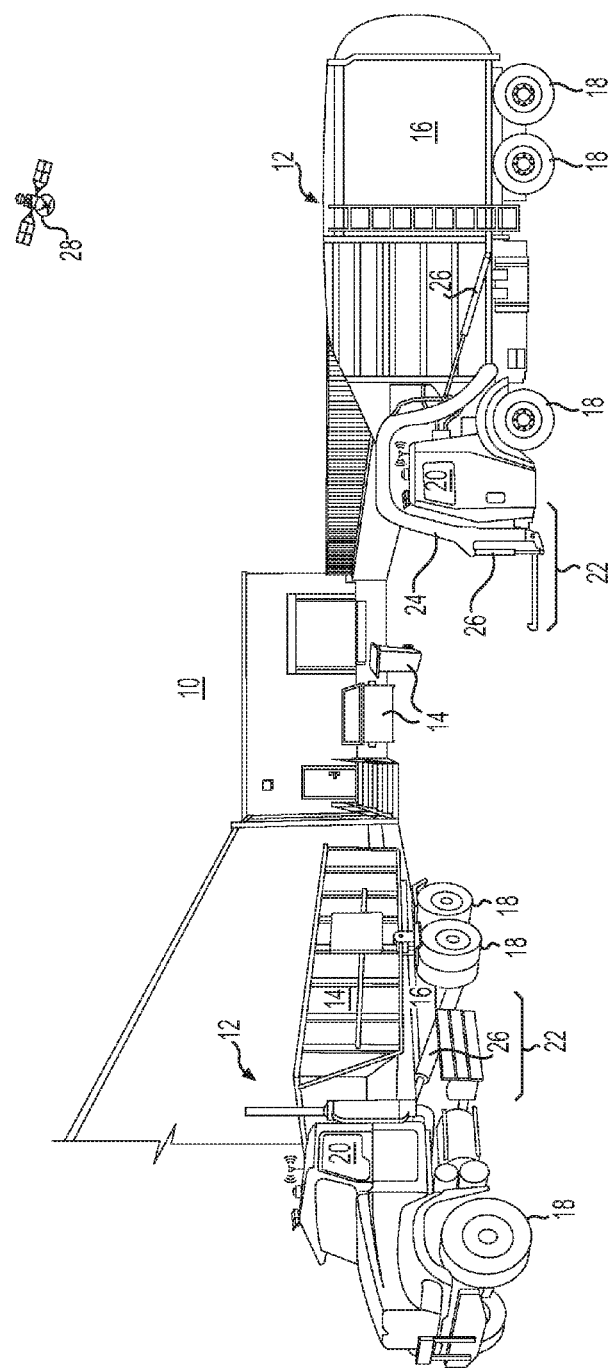
FIG. 1 is a perspective illustration of an exemplary disclosed waste management environment.

FIG. 1 illustrates an exemplary waste management environment ("environment") 10, at which one or more vehicles 12 are providing waste services. Environment 10 may include a retail store, a factory, a government building, a residential address, or another location having one or more receptacles 14 that require the service of vehicle(s) 12. The service may include, for example, the removal of waste materials from inside of receptacle(s) 14, the replacement of receptacle(s) 14, and/or the placement of new or additional receptacles 14.

Vehicle 12 may take many different forms. In the example shown on the right in FIG. 1, vehicle 12 is a hydraulically actuated, front-loading type of vehicle. Specifically, vehicle 12 may include a bed 16 supported by a plurality of wheels 18, a cab 20 located forward of bed 16, and a lifting device 22 extending forward of cab 20. Lifting device 22 may consist of, among other things, one or more lift arms 24 configured to engage and/or grasp receptacle 14, and one or more actuators 26 powered by pressurized oil to raise and tilt lift arms 24 (and receptacle 14) up past cab 20 to a dump location over bed 16. After dumping of receptacle 14, pressurized oil may be released from hydraulic actuator(s) 26 to allow lowering of lift arms 24 and receptacle 14 back to the ground in front of vehicle 12. In other examples, lifting device 22 may be located to pick up receptacles 14 from a side and/or a rear of vehicle 12. In yet other examples, receptacles 14 may be manually lifted and dumped into bed 16. In any of these examples, bed 16 could be outfitted with a compactor (not shown) to compact the waste material after the material is dumped into bed 16, and/or a door (not shown) configured to close an opening of bed 16 through which the waste material is dumped. Other configurations may also be possible.

In the example shown on the left in FIG. 1, vehicle 12 is a hydraulically actuated flatbed or roll-off type of vehicle. Specifically, vehicle 12 may include a bed 16 supported by a plurality of wheels 18, a cab 20 located forward of bed 16, and a lifting device 22 extending rearward of cab 20. Lifting device 22 may consist of, among other things, one or more actuators 26 powered by pressurized oil to raise and tilt receptacle 14 up onto bed 16 for transportation of receptacle 14 away from environment 10. After dumping of receptacle 14 at a disposal site (or swapping a full receptacle 14 for an empty receptacle 14), receptacle 14 may be returned to environment 10 and lowered back to the ground behind vehicle 12 (e.g., by releasing pressurized oil from hydraulic actuator(s) 26).

As each vehicle 12 moves about environment 10, a satellite 28 or other tracking device may communicate with an onboard controller 30 (shown only in FIG. 2) to monitor the movements of vehicle 12 and the associated changes made to environment 10 (e.g., pickup, dumping, placement, etc.). As will be explained in more detail below, onboard controller 30, or a separate offboard controller (e.g., a controller 32 located in a back office 34 or other service facility—shown only in FIG. 2), may then manage future operations of vehicle 12 (and other similar vehicles 12) based on these movements and changes.

Both of onboard and offboard controllers 30, 32 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
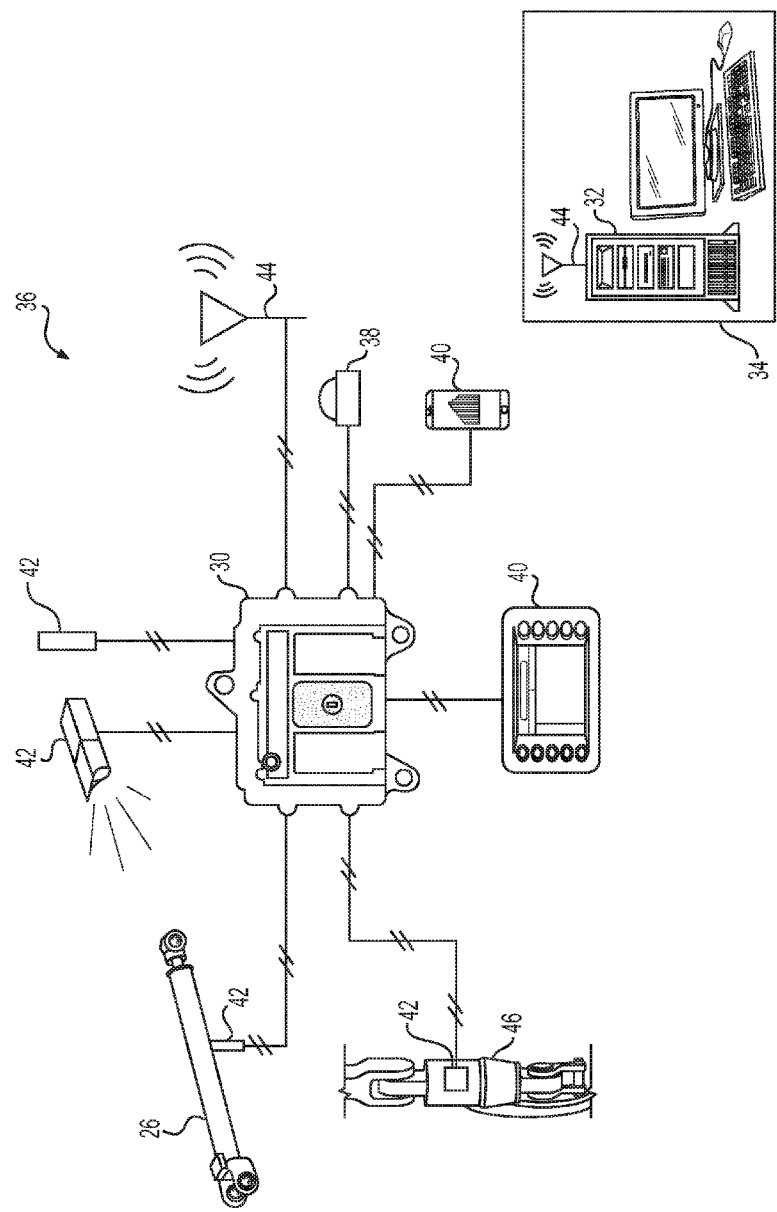
FIG. 2 is a diagrammatic illustration of an exemplary disclosed system that may be used to manage the environment of FIG. 1.

As shown in FIG. 2, onboard controller 30 may form a portion of a waste management system ("system") 36 that is configured to track, assist, and/or control movements of vehicle(s) 12 (shown only in FIG. 1). In addition to onboard controller 30, system 36 may also include a locating device 38, and at least one of an input device 40 and a sensor 42 mounted or otherwise located onboard each vehicle 12. In some embodiments, system 36 includes both manual input device 40 and one or more sensors 42. In other embodiments, sensor 42 (and/or controller 30) may be internal to input device 40. Onboard controller 30 may be in communication with each of these other components and/or with offboard controller 32 at back office 34 (e.g., via a communication device 44), and configured to determine, based on signals from these components and based on other known information stored in memory, the location of each vehicle 12 and characteristics and locations of receptacles 14 being moved by and/or in a vicinity of each vehicle 12.

Locating device 38 may be configured to generate location signals indicative of a geographical position and/or orientation of vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of vehicle 12, for example of lift arms 24 and/or actuators 26 (shown only in FIG. 1). Based on the location signals generated by locating device 38 and based on known kinematics of vehicle 12, onboard controller 30 may be able to determine in real time the position, heading, travel speed, acceleration, and orientation of vehicle 12, lift arms 24, and/or actuators 26. This information may then be used by onboard and/or offboard controllers 30, 32 to update the locations and conditions of vehicles 12 and/or receptacles 14 in an electronic map or database of environment 10.

It is contemplated that locating device 38 may take another form, if desired. For example, locating device 38 could be or otherwise include an RFID reader configured to interact with an RFID tag located within environment 10 (e.g., at a customer location, on receptacle 14, etc.), or another type of scanner configured to read another type of indicia (e.g., a barcode) within environment 10. Based on the reading of the RFID tag or other indicia, the location and/or orientation of vehicle 12 may be linked to the known location of the RFID tag or other indicia within environment 10. It is also contemplated that a separate RFID or barcode reader could be included in system 36, if desired.

Input device 40 may provide a way for an operator of vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and or other information about the receptacle and waste engaged by, loaded into, or otherwise processed by vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, route information, payload information (e.g., weight and/or volume), questions, etc.

In some embodiments, input device 40 may be configured to execute a waste management application. For example, when input device 40 is a mobile device (for example a smartphone, tablet, or watch), the application can be a mobile app ("app"). An app is an abbreviated term for a "software application", which is downloadable to and executable by a mobile device (e.g., a laptop, a smartphone, a tablet, a dash-mounted display, etc.). The disclosed waste management app can provide a graphical user interface (GUI) configured to display information about a waste service operation to the operator of vehicle 12; and that receives input from the operator used to configure acquisition of operational data by sensor(s) 42, to transmit the operational data to controllers 30, 32, to receive and display information about a current operation (e.g., as monitored by sensor(s) 42), etc.

Sensors 42 may be configured to monitor parameters associated with the waste material loaded into vehicle 12 and/or the associated receptacles 14 being moved by vehicle 12 (e.g., moved by lift arms 24), and to generate corresponding service signals indicative thereof. Each of these sensors 42 may be any type of device known in the art, and located anywhere on or in vehicle 12. In one example, sensor 42 is a lift sensor, such as any one or more of a load cell, a force gauge, a pressure sensor, a motion sensor, or another type of lift sensor associated directly with lift arms 24, with actuator(s) 26, with receptacle 14, and/or with a strut 46 supporting bed 16. In this example, the service signals generated by sensor(s) 42 may correspond with strain on lift arms 24, with a force applied to lift arms 24 by actuator(s) 26, with a payload weight of bed 16, with a motion of receptacle 14, with a weight of waste contained inside receptacle 14, etc.

Alternatively, one or more sensors 42 may be associated with a power source or drivetrain of vehicle 12, and configured to generate signals indicative of an amount of power used to propel vehicle 12, to drive the hydraulics of actuators 26, to move the in-bed compactor, or to shut the associated door. Other types of sensors 42 (e.g., cameras, spectrometers, IR sensors, RADAR sensors, LIDAR sensors, etc.) may also be utilized to determine characteristics (e.g., load profile, volume, and/or shape) of the waste material inside receptacles 14 or of receptacles 14 themselves. In yet further examples, sensor 42 could be an acoustic sensor (e.g., one or more microphones), an accelerometer, or another similar type of sensor configured to detect engagement conditions and/or cycle completion of lift arms 24, the in-bed compactor, the door, etc. during lifting, dumping, and/or shaking of receptacle 14. Other types of sensors 42 may alternatively or additionally be utilized. Service signals generated by these sensors 42 may be communicated to onboard and/or offboard controllers 30, 32, and the corresponding processing unit may use the signals to determine conditions surrounding receptacles 14 (and/or the waste inside receptacles 14) during servicing by vehicle 12. As described above, any one or more of sensors(s) 42 may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and offboard controller 32 located at back office 34. For example, onboard controller 30 may receive location signals from locating device 38, informational signals from input device(s) 40, and service signals from sensor(s) 42, and correlate the signals, filter the signals, buffer the signals, record the signals, or otherwise condition the signals before directing the signals offboard via communication device 44.

Communication device 44 may be configured to facilitate communication between onboard controller 30 and offboard controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and offboard controller 32 may communicate directly with locating device 38, input device(s) 40, and/or sensor(s) 42 via communication device 44, if desired. Other means of communication may also be possible.

Onboard and/or offboard controllers 30, 32, based on the information received from onboard vehicles 12 and also based on information received from other sources (e.g., from the Internet, from input received at back office 34, etc.), can be configured to execute instructions stored on computer readable medium to perform methods of waste management at environment 10. For example, onboard and/or offboard controllers 30, 32 may be configured to monitor when vehicle 12 is nearing a service location, when vehicle 12 has stopped, when vehicle 12 is servicing receptacle 14 at the stop (i.e. when vehicle 12 has completed a service stop), when vehicle 12 is filled with waste to a maximum capacity, etc. This monitoring may then be used to determine which one of a plurality of different available routes a particular vehicle 12 is completing, and to record characteristics of the services performed during completion of the route. In addition, once the route being followed by the particular vehicle 12 has been determined, the disclosed app may be called into the foreground of or otherwise displayed on input device 40 and made available for use by the operator. In some embodiments, the disclosed app may already be in the foreground on input device 40 at a time when the route is automatically determined. In this situation, information associated with the determined route may then be displayed. Use of the app may facilitate route adjustment and scheduling for vehicle 12, tracking of business costs and efficiencies, record keeping and billing, performance tracking and incentivizing, etc.

Figure 3:
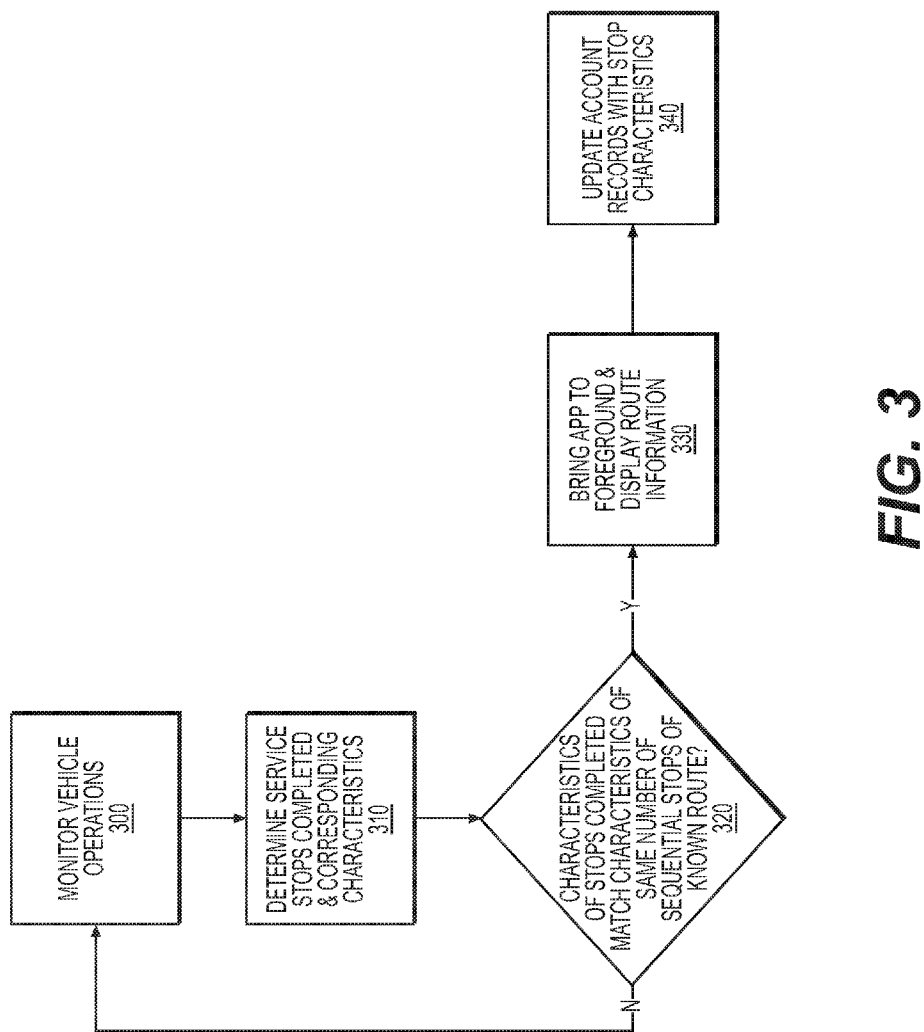
FIG. 3 is an exemplary disclosed method that may be completed by the system of FIG. 2.
Figure 4:
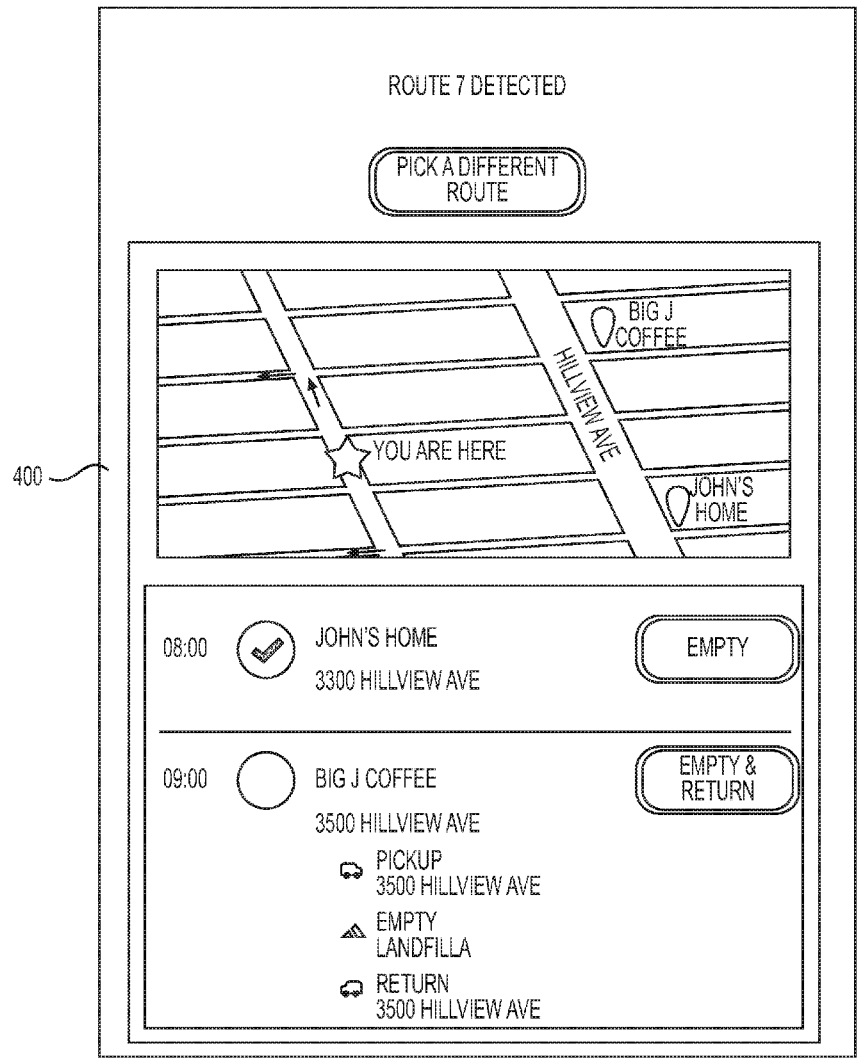
FIG. 4 is a diagrammatic illustration of an exemplary disclosed graphical user interface that may be used to access the system of FIG. 2.

An exemplary process of waste service management that may be performed by onboard and/or offboard controllers 30, 32 is illustrated in FIG. 3 and will be explained in more detail in the following section to further illustrate the disclosed concepts. In addition, FIG. 4 represents an exemplary Graphical User Interface (GUI) that may be shown in connection with the disclosed waste management app on any input device 40 for use by the operator of service vehicle 12 to access system 36. FIG. 4 will also be discussed in greater detail below to further illustrate the disclosed concepts.

INDUSTRIAL APPLICABILITY

The disclosed system, method, and app may be applicable to the waste service industry, where efficient management of waste services can affect efficiency and profitability for a provider. The disclosed system, method, and app may give the provider a way to show individual vehicle operators the daily tasks assigned to a particular vehicle in an organized manner. For example, the disclosed system, method, and app may provide a graphical user interface (GUI) allowing the operator to see a schedule of the daily tasks arranged in an order that reduces time, effort, unscheduled stops, and fuel, while also satisfying customer expectations. The GUI provided by the disclosed system, method, and app may also relay to the operator visual directions to customer locations and service instructions for each location. In addition, the GUI may provide visual status indications associated with the service tasks, and allow the operator to provide feedback or other input regarding the tasks, the customer locations, the service vehicle, the schedule, etc. Finally, the disclosed system, method, and app may be used to track service operations, provide feedback to customers and service providers, and to update records associated with performed services. The disclosed app may be automatically called up by the disclosed system into a foreground of input device 40 and made available for use by the operator, without prior input from the operator being required. Operation of the disclosed system and app will now be described in detail with respect to FIGS. 3 and 4.

As seen in FIG. 3, the disclosed method may be implemented by onboard controller 30 and/or offboard controller 32 (e.g., by at least one processing unit of at least one of these controllers), and begin with monitoring of vehicle operations (Step 300). The vehicle operations may include, for example, travel of vehicle 12 (e.g., tracking of location, heading, speed, and/or acceleration), a date of travel, a time of travel and/or stopping, a duration of stopping, use of lifting device 22 (e.g., receptacle lifting, tilting, dumping, and associated force or weight changes), use of the in-bed compactor (if available), use of the bed door (if equipped), engagement and/or movement of receptacles 14, and/or other similar service related characteristics. These characteristics may be monitored via locating device 38, sensor(s) 42, and/or input device 40.

In some instances, the operations of vehicle 12 may be continuously monitored. In other instances, the operations may be monitored only at a particular time of day (e.g., during a typical work shift), only during particular days of the week (e.g., only during the typical work week), only after vehicle 12 has been turned on, only when input device 40 (e.g., the smartphone or tablet embodiment of input device 40) is placed within a threshold proximity to (e.g., inside of) vehicle 12, only when input device 40 is in communication with (e.g., has been paired with) the other components of system 36, etc. In the disclosed embodiment, initiation of service monitoring does not require input (e.g., login) from the operator. Instead, monitoring may be controlled via the disclosed app, which may always be running in a background of input device 40.

During monitoring of vehicular operations, the appropriate processing unit(s) may determine if any service stops have been completed and characteristics corresponding to the completed service stops (Step 310). The determination of completed service stops may be made based on comparison of the monitored operations with one or more threshold values. As described above, the operations may be monitored via locating device 38 and/or sensors 44 and represented as location and/or service signals processed by onboard controller 30 and/or offboard controller 32. For example, when a monitored travel speed of vehicle 12 falls below a threshold value, it can be concluded that vehicle 12 has stopped. And if a monitored movement of lifting device 22 corresponds with a minimum movement and/or force threshold, it can be concluded that a receptacle 14 was lifted, tilted, and/or dumped into bed 16. When these actions follow each other sequentially and within a threshold period of time, it can be concluded that service was performed at the stop.

The processing unit(s) may keep track of the completed service stops, the order of the stops, and the monitored characteristics corresponding to the stops, and compare this information to information stored in memory to determine if a travel path currently being followed by service vehicle 12 is a known service route (Step 320). In particular, onboard and/or offboard controllers 30, 32 may have stored in memory a plurality of different and known service routes, one of which should be followed by the particular service vehicle 12. Each of these known service routes may include a finite number of service stops arranged in a particular order. And each of the service stops may have a corresponding location, and a set of characteristics corresponding to how the service should be completed. For example, the characteristics may include a location of the service stop, a day and/or time of expected service, an expected duration of the service, a number, type, size, and/or condition of receptacles 14 that should be emptied and/or onloaded by vehicle 12, a type of material expected to be in receptacles 14, an expected weight of the waste inside of receptacles 14, and/or an expected type of service (e.g., front lift and tilt, side tilt, rear manual lift, receptacle onload, etc.) to be performed with regard to receptacles 14. In some instances, the characteristics may be at least partially dependent on a date of a last service, a day of the week of the current service, etc.

At step 320, after a number of service stops have been monitored, the appropriate processing unit(s) may compare the characteristics of the monitored service stops to stored characteristics of the same number of service stops listed in sequential order in each of the known routes to determine if the travel path currently being followed by vehicle 12 substantially matches one of the known service routes. For example, during a particular monitoring operation, a particular vehicle 12 may be observed to make four different service stops. These stops could include, for example, four different geographical locations visited in sequential order, each stop occurring at a different time and/or taking a different amount of time to complete. At these four stops, three different sizes of dumpsters (e.g., a 4 yd. dumpster, a 6 yd. dumpster, and then an 8 yd. dumpster) were lifted, tilted, and dumped into bed 16 by lifting device 22, and one rubbish can was manually lifted and dumped into bed 16. The weights and/or types of waste material received from each of these receptacles 14 may be determined, and then the number, type, size, sequence, and/or corresponding waste material weights and/or types compared to the characteristics of four sequential stops within each of the known service routes stored in memory. When the comparison indicates a substantial match (e.g., within a threshold certainty), control may proceed to the next step. Otherwise, control may return to Step 300.

In one embodiment, following completion of Step 320 (i.e., after Step 320:Y), the appropriate processing unit(s) may call the disclosed app to the foreground within input device 40 and cause information to be displayed in association with the known route (Step 330). The information may include, for example, all assigned stops within the known route (e.g., a listing of scheduled stops provided in a particular order). The information may also include a name of each stop, an address of each stop, a map showing the location of each stop, a desired service time and/or duration for each stop, and instructions regarding particular service tasks (e.g., pickup, empty, return, etc.) to be performed at each stop. In addition, the information may include an indication as to which service stops have been completed, and which service stop is to be completed next. The disclosed processing unit(s) may continue to monitor operations of vehicle 12, and update account records (e.g., customer records, provider records, vehicle records, operator records, etc.) with information from the previously monitored operations as well as from operations to be monitored in association with a remainder of the known route (Step 340).

In the same or another embodiment, following completion of step 320, the appropriate processing unit(s) may alternatively or additionally simply track and report completion of the current service route. That is, the disclosed method may provide a way to monitor characteristics (e.g., accuracy, timeliness, efficiency, productivity, volume, etc.) associated with operator and/or vehicle performance in association with the current service route, without the operator having to interact with the system. Information collected during completion of the service route may be recorded and reported to back office 34 during and/or after the service.

FIG. 4 shows an exemplary GUI 400, which may be used to facilitate the method that is described above and shown in FIG. 3. GUI 400 may be shown on any input device 40 and, as can be seen in FIGS. 3 and 4, may correspond with steps 320 and 330 in the flowchart of FIG. 3. In particular, after completing step 320 and determining that the current travel path of vehicle 12 substantially matches one of the known service routes stored in memory, GUI 400 may be called into the foreground of input device 40. In some instances, the matching of step 320 may be indicated within GUI 400, allowing the operator to override the processing unit's determination and pick a different one of the known routes.

In the example shown in FIG. 4, two stops are listed in the known route. The two stops include a first stop at John's Home and a second stop at Big J Coffee. It should be noted that each service route could include any number of stops. John's Home is shown as being located at 3300 Hillview Ave and has a scheduled service time of 8:00 am. Big J. Coffee is shown as being located at 3500 Hillview Ave and has a later scheduled service time of 9:00 am. The service to be completed at John's Home is simply to empty an existing receptacle 14 into bed 16 of vehicle 12; while the service to be completed at Big J Coffee is to pick up an existing receptacle 14, take the receptacle 14 to a particular land fill (i.e., to Landfill A), and then to return the empty receptacle 14 back to Big J Coffee. Other service tasks could also or alternatively be associated with each stop, as desired. The service at John's Home is shown as having been completed (e.g., with a checkmark).

The completion of service at a particular stop in an assigned route may be confirmed manually and/or automatically, as desired. For example, upon completion of a particular service task at a particular location, the operator of vehicle 12 may provide manual input indicative of the completion to input device 40. This input could include, for example, pressing of a button, touching of a screen (e.g., touching the checkmark area shown in FIG. 4 at the left of "John's Home"), voicing an audible command, etc.

After confirmation is received that waste services at a particular stop in the assigned route have been completed, the map shown in GUI 400 may represent the relative location of vehicle 12, a next stop in the route, and/or directions from the current vehicle location to the next stop. That is, after completion of a service task at one stop, the disclosed app may cause the map to be automatically updated and correspond with the next stop. It is also contemplated that the operator may manually request the relative location associated with any particular stop to be shown in the map of GUI 400, if desired, regardless of the status of a particular service task.

The interface illustrated in FIG. 4 is exemplary only and provided to highlight certain aspects of the disclosed system. Other views and functionality are contemplated, as would be understood by one of skill in the art. It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for managing waste services by a service vehicle, comprising:
   a locating device configured to generate a location signal indicative of a location of the service vehicle;
   a sensor configured to generate a service signal indicative of a waste service being performed by the service vehicle;
   an input device; and
      a controller in communication with the locating device, the sensor, and the input device, the controller being configured to:
      make a determination that the service vehicle has made at least one service stop based on the location and service signals;
      make a comparison of characteristics of the at least one service stop with characteristics of at least one service stop of at least one known service route;
      based on the comparison, selectively record the characteristics of all stops in the at least one known service route; and
      transmit the recorded characteristics offboard the service vehicle.

2. The system of claim 1, wherein:
   the at least one known service route includes a plurality of known service routes stored in memory; and
   the at least one service stop includes a plurality of sequential service stops.

3. The system of claim 1, wherein the sensor is one of a lift sensor, a camera, and an acoustic sensor.

4. The system of claim 1, wherein:
   the input device is mobile; and
   the controller is configured to make the determination only when the input device is within a threshold proximity of the service vehicle.

5. The system of claim 4, wherein the input device is one of a smartphone or a tablet.

6. The system of claim 1, wherein the controller is further configured to selectively call to a foreground of the input device a graphical user interface displaying information associated with the at least one known service route based on the comparison.

7. The system of claim 6, wherein the information associated with the at least one known service route includes a schedule of service stops to be completed by the service vehicle.

8. The system of claim 7, wherein the information associated with the at least one known service route further includes a map showing a location of the service vehicle relative to the service stops in the schedule.

9. They system of claim 7, wherein the information associated with the at least one service route further includes instructions regarding each of the service stops in the schedule.

10. The system of claim 1, wherein the controller is further configured to update account records associated with the at least one service stop based on the location signal, the service signal, and the comparison.

11. The system of claim 1, wherein the characteristics of the at least one service stop include at least one of a service location, a date of service, a time of service, a duration of service, a type of service completed, a size of receptacle serviced, an amount of waste material received, and a type of waste material received.

* * * * *